(12) United States Patent
Koncz

(10) Patent No.: US 9,505,354 B2
(45) Date of Patent: Nov. 29, 2016

(54) CARBON FIBER REINFORCED POLYMER CARGO BEAM WITH INTEGRATED CARGO STANCHIONS AND C-SPLICES

(71) Applicant: The Boeing Company, Seal Beach, CA (US)

(72) Inventor: Tibor A Koncz, Monroe, WA (US)

(73) Assignee: THE BOEING COMPANY, Chicago, IL (US)

( * ) Notice: Subject to any disclaimer, the term of this patent is extended or adjusted under 35 U.S.C. 154(b) by 398 days.

(21) Appl. No.: 14/028,110

(22) Filed: Sep. 16, 2013

(65) Prior Publication Data

US 2015/0076198 A1 Mar. 19, 2015

(51) Int. Cl.
| | |
|---|---|
| *B64C 1/06* | (2006.01) |
| *B60R 11/00* | (2006.01) |
| *B64C 1/18* | (2006.01) |
| *B64C 1/20* | (2006.01) |
| *B64F 5/00* | (2006.01) |

(52) U.S. Cl.
CPC ............... *B60R 11/00* (2013.01); *B64C 1/061* (2013.01); *B64C 1/18* (2013.01); *B64C 1/20* (2013.01); *B64F 5/0009* (2013.01); *B60R 2011/0003* (2013.01); *Y02T 50/433* (2013.01); *Y10T 29/49622* (2015.01)

(58) Field of Classification Search
CPC .................................... B64C 1/18; B64C 1/20
See application file for complete search history.

(56) References Cited

U.S. PATENT DOCUMENTS 1,963,416 A * 6/1934 Minshall ................. B64C 1/068
244/119
2,299,992 A * 10/1942 Kennedy ................... B63B 3/26
114/26
5,171,510 A * 12/1992 Barquet ................... B29C 70/44
156/173
6,355,133 B1 * 3/2002 Williams ............. B29C 70/205
156/166
8,342,448 B2 * 1/2013 Huber ....................... B64C 1/20
244/117 R (Continued)

FOREIGN PATENT DOCUMENTS

DE 102007030026 1/2009
DE 102007030026 A1 * 1/2009 ............. B64C 1/061

(Continued)

OTHER PUBLICATIONS

Canadian Intellectual Property Office; Office Action for Application No. 2,856,770 dated Jul. 15, 2015.

(Continued)

*Primary Examiner* — Elizabeth A Quast
(74) *Attorney, Agent, or Firm* — Parsons Behle & Latimer

(57) ABSTRACT

A cargo beam assembly for an aircraft including a carbon fiber reinforced polymer (CFRP) cargo beam and a plurality of CFRP stanchions and CFRP c-splice plates each connected to the CFRP cargo beam by overlapping CFRP plies. The flanges of the cargo beam assembly may all be facing a single direction. The components of the assembly may all be formed with CFRP plies configured in a traditional and non-traditional layup. The CFRP stanchions and CFRP c-splice plates are configured to connect the cargo beam assembly to a keel frame of an aircraft. The upper flange of the CFRP cargo beam may include a pad up above each CFRP stanchion connected to the CFRP cargo beam. The interface between each CFRP stanchion and the CFRP cargo beam may be a flange radius that includes a ramped pad up. Darting may provide load transfer between a CFRP stanchion and the CFRP cargo beam.

20 Claims, 8 Drawing Sheets

(56) References Cited

U.S. PATENT DOCUMENTS

| | | | |
|---|---|---|---|
| 8,439,307 B2* | 5/2013 | Westphal | B64C 1/061 244/119 |
| 2004/0040252 A1* | 3/2004 | Beral | B64C 1/062 52/840 |
| 2007/0007392 A1* | 1/2007 | Huber | B64C 1/061 244/137.1 |
| 2008/0093503 A1* | 4/2008 | Cacciaguerra | B64C 1/061 244/119 |
| 2009/0206202 A1* | 8/2009 | Bolukbasi | B64C 1/062 244/121 |
| 2009/0294588 A1* | 12/2009 | Griess | B64C 1/068 244/121 |
| 2009/0320398 A1* | 12/2009 | Gouvea | B29C 66/721 52/309.1 |
| 2011/0097554 A1* | 4/2011 | Kehrl | B29C 70/207 428/174 |
| 2012/0076973 A1* | 3/2012 | Guzman | B29C 70/207 428/113 |
| 2012/0076989 A1* | 3/2012 | Bland | B29C 70/205 428/174 |
| 2013/0009008 A1* | 1/2013 | Westphal | B64C 1/061 244/119 |
| 2013/0306794 A1* | 11/2013 | Zahlen | B64C 1/068 244/118.5 |
| 2013/0306795 A1* | 11/2013 | Delahaye | B64C 1/068 244/119 |
| 2014/0042271 A1* | 2/2014 | Paci | B29C 70/30 244/118.1 |
| 2014/0065354 A1 | 3/2014 | Smith, Jr. et al. | |
| 2014/0190625 A1 | 7/2014 | Buttrick et al. | |
| 2015/0225062 A1* | 8/2015 | Lansiaux | B64C 1/061 244/119 |

FOREIGN PATENT DOCUMENTS

| | | | |
|---|---|---|---|
| EP | 2695726 | 2/2014 | |
| EP | 2848518 A1 * | 3/2015 | B60R 11/00 |
| WO | 2006051235 | 5/2006 | |

OTHER PUBLICATIONS

European Patent Office; Extended European Search Report issued in European Patent Application No. 14183430.9 dated Feb. 18, 2015.
Canadian Intellectual Property Office; Office Action issued in Canadian Patent Application No. 2,856,770 dated May 31, 2016.

* cited by examiner

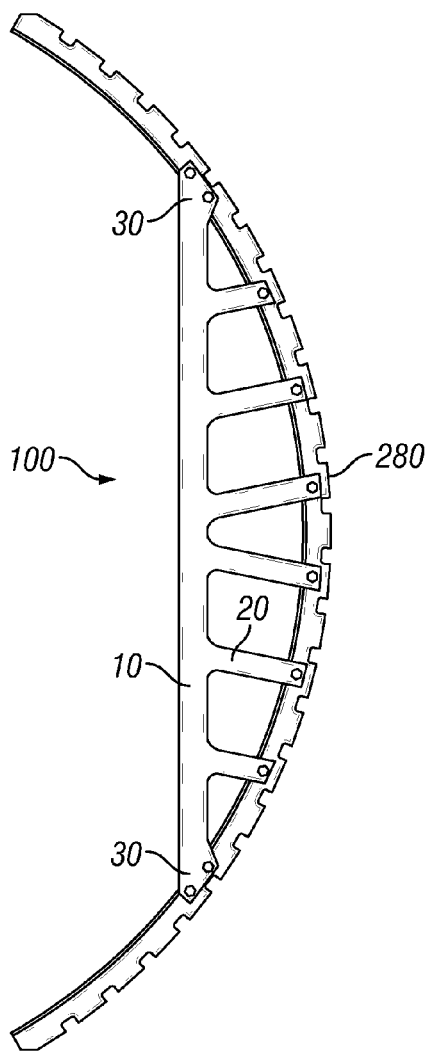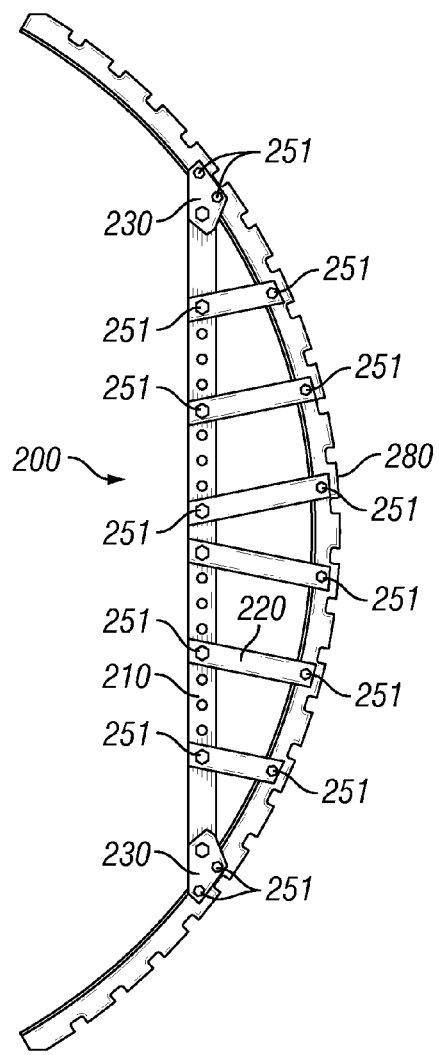
FIG. 7
FIG. 8
(Prior Art)

CARBON FIBER REINFORCED POLYMER CARGO BEAM WITH INTEGRATED CARGO STANCHIONS AND C-SPLICES

FIELD OF THE DISCLOSURE

A cargo beam assembly of carbon fiber reinforced polymer (CFRP) components formed together to form a single piece assembly that may be attached to a keel frame of an aircraft. The components of the assembly may be formed from non-traditional layup pattern of CFRP plies.

BACKGROUND

Present cargo beam assemblies are formed from a plurality CFRP components combined together by fasteners. The cargo beam assembly includes a CFRP cargo beam having a top flange or chord and a bottom flange or chord. A plurality of CFRP cargo stanchions, typically six (6) individual stanchions, are connected to the CFRP cargo beam by a plurality of fasteners. The CFRP cargo beam stanchions also include two flanges or chords. When fastening the CFRP stanchions to the CFRP cargo beam, the chords of the CFRP cargo stanchions must be oriented in a different direction from the chords of the CFRP cargo beam. For example, the lower chord of the CFRP cargo beam may face rearward to the back of the aircraft and the chords of the CFRP cargo stanchions may face forward to the front of the aircraft. The chords of the components require them to be fastened with the backs together. The CFRP cargo stanchions may then be connected to a keel frame of an aircraft.

FIG. 8 shows a prior art cargo beam assembly 200 connected to a keel frame 280. Each stanchion 220 must be connected to the cargo beam 210 with a plurality of fasteners 251. Likewise, each c-splice plate 230 must be connected to an end of the cargo beam 210 with a plurality of fasteners 251

As discussed above, fasteners are used to connect a CFRP c-splice plate to each end of the CFRP cargo beam. Again, the lower chords of the CFRP c-splice plates and the lower chord of the CFRP cargo beam require that the chords of each component be facing a different direction when connected together. The CFRP c-splice plates also connect the assembly to a keel frame of an aircraft. The construction of the cargo beam assembly requires nine (9) individual parts to be connected together to form an assembly that must then be connected to the keel frame of an aircraft. The present CFRP cargo beam is also called a "J" beam due to its cross-sectional shape. The "J" beam is composed from a "C" channel and a "Z" shaped beam capped with a rectangular plate along the entire cargo beam length enclosing a filler, called a "noodle," in the natural void between the three components. The end product is a co-cured CFRP "J" beam.

SUMMARY

It may be beneficial to provide a one-piece cargo beam assembly that may be connected to a keel frame of an aircraft. It may be beneficial to provide a one-piece cargo beam assembly that permits the chords of the assembly to be facing the same direction when connected to an aircraft. It may be beneficial to provide a one-piece cargo beam assembly that does not require the use of a noodle.

One configuration of a cargo beam assembly for an aircraft comprises a carbon fiber reinforced polymer (CFRP) cargo beam, a plurality of CFRP stanchions integrally coupled to the cargo beam; a first CFRP c-splice plate integrally coupled to a first end of the cargo beam; and a second CFRP c-splice plate integrally coupled to a second end of the cargo beam. The plurality of CFRP stanchions may be configured to be attached to a keel frame of an aircraft. The first and second CFRP c-splice plates may be configured to be attached to a keel frame of an aircraft. The CFRP cargo beam and the plurality of CFRP stanchions may comprise of plurality of CFRP plies configured in a non-traditional layup. The integral components of the CFRP cargo beam assembly may each comprise two flanges, which may each be oriented in a single direction.

The cargo beam assembly may comprise at least one pad up containing additional CFRP plies at an interface between the CFRP cargo beam and one CFRP stanchion. The interface between the CFRP cargo beam and the CFRP stanchion may comprise a flange radius. The cargo beam assembly may comprise a ramp at each end of the interface between the CFRP cargo beam and the CFRP stanchion. The cargo beam assembly may comprise a plurality of alternating darts in the interface between the CFRP cargo beam and the CFRP stanchion. The alternating darts may be configured to provide load transfer between the CFRP cargo beam and the CFRP stanchion at the interface. An upper flange of the CFRP cargo beam may comprise at least one pad up containing additional CFRP plies. The upper flange of the CFRP cargo beam may comprise a plurality of pad ups containing additional CFRP plies. Each of the plurality of pad ups may be positioned above a single CFRP stanchion.

A method to manufacture a one-piece cargo beam assembly for an aircraft comprises forming a carbon fiber reinforced polymer (CFRP) cargo beam from a plurality of CFRP plies having a first thickness, an upper flange, and a lower flange. The method comprises forming a plurality of CFRP stanchions that project from the lower flange of the CFRP cargo beam from a plurality of CFRP plies having a second thickness. The CFRP plies of the CFRP stanchions combining with the CFRP plies of the CFRP cargo beam to form an interface having a third thickness greater than the first thickness of the CFRP cargo beam and greater than the second thickness of the CFRP stanchions. The method comprises forming two CFRP c-splice plates from a plurality of CFRP plies. The CFRP plies of each CFRP c-splice plate combining with the CFRP plies located at an end of the CFRP cargo beam. A one-piece assembly is formed comprised of the CFRP cargo beam, CFRP stanchions, and CFRP c-splice plates.

The method may comprises providing CFRP plies in a non-traditional layup pattern to form the pad up at each intersection of the CFRP cargo beam and each of the plurality of CFRP stanchions. The method may comprise connecting the CFRP c-splice plates and CFRP stanchions to a keel frame. The method may comprise forming pad ups along an upper flange of the CFRP cargo beam above each of the plurality of CFRP stanchions, wherein the pad ups are formed by the layup of additional CFRP plies. The interface between each CFRP stanchion with the lower flange of the CFRP cargo beam includes two arch structures. The method may comprise darting of the arch structures of each interface between the CFRP cargo beam and the CFRP stanchions. The method may comprise alternating the darting for each interface, wherein the alternating of the darting may provide load transfer between the CFRP cargo beam and the CFRP stanchion at the interface. The method may comprise forming a ramp on each end of the interface between the CFRP cargo beam and each CFRP stanchion.

BRIEF DESCRIPTION OF THE DRAWINGS

FIG. 7 shows a configuration of a cargo beam assembly having a CFRP cargo beam with integral CFRP stanchions and CFRP c-splice plates connected to a keel frame of an aircraft;

FIG. 8 shows a cargo beam bolted to c-splice plates and stanchions, the c-splice plates and stanchions being connected to a keel frame of an aircraft;

Figure 1:
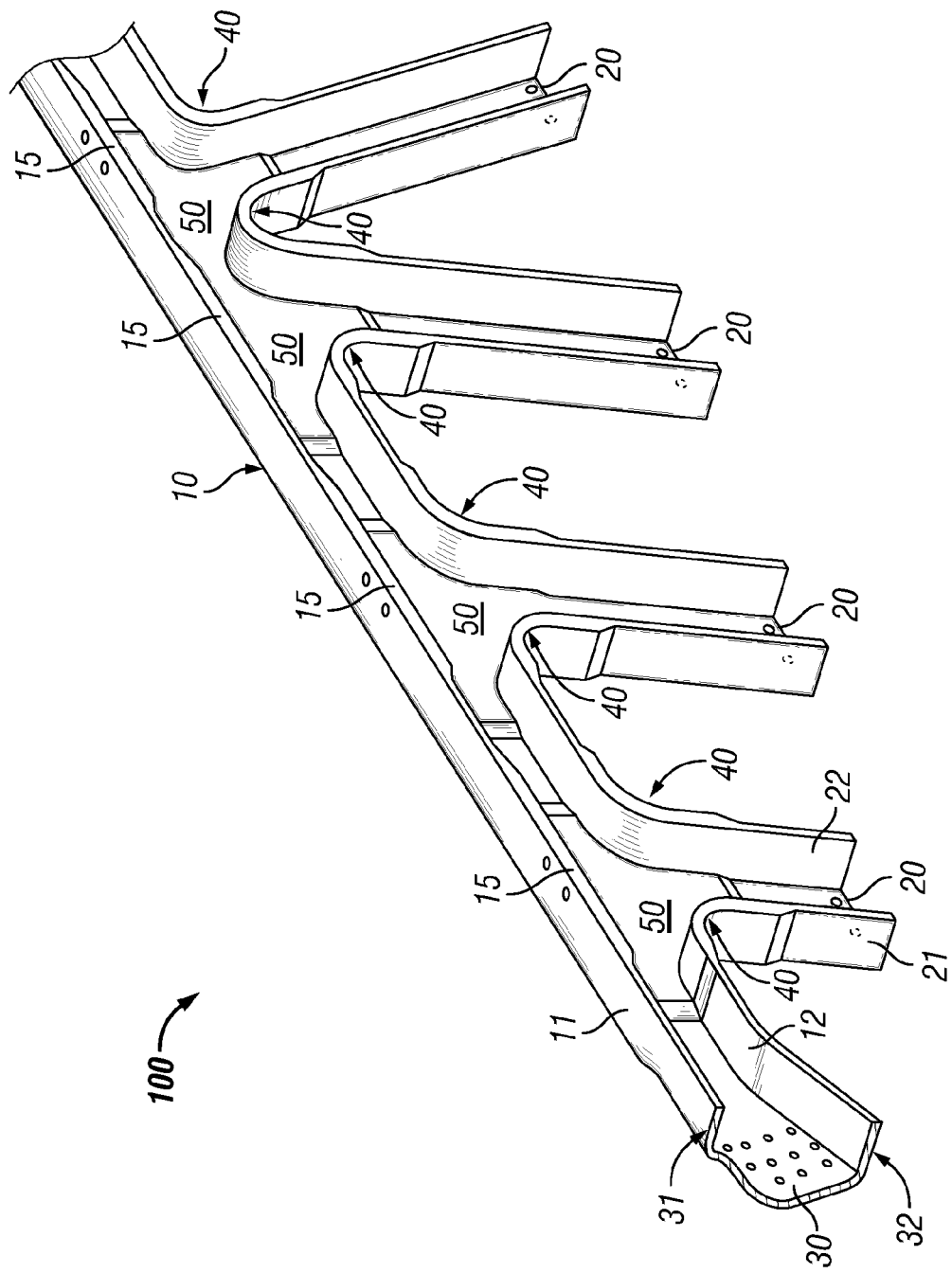
FIG. 1 illustrates a configuration of a cargo beam assembly having a CFRP cargo beam with integral CFRP stanchions and CFRP c-splice plates.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

FIG. 1 shows an integral one piece CFRP beam assembly that may be formed from a plurality of CFRP components. Such an integral one piece CFRP beam assembly may be a cargo beam assembly 100 that may be connected to a keel frame 280 (shown in FIG. 7) of an aircraft. The cargo beam assembly 100 includes a CFRP cargo beam 10 connected to a plurality of CFRP stanchions 20. The CFRP stanchions 20 are adapted to connect the cargo beam assembly 100 to a keel frame 280. A CFRP c-splice plate 30 is connected to each end of the CFRP cargo beam 10. The CFRP c-splice plates 30 are also adapted to connect the cargo beam assembly 100 to a keel frame 280. Each component of the cargo beam assembly 100 has its own traditional layup based on the unique local ply orientation system attached to each individual component. However, by merging together plies of the CFRP stanchion 20 with plies of the CFRP cargo beam 10 at the pad up location, the newly merged layup may be a non-traditional layup. A traditional layup is defined herein as a layup of CFRP plies that includes fibers oriented only in one of four specific orientations. The orientations are either zero (0) degrees, forty-five (45) degrees, negative forty-five (−45) degrees, or ninety (90) degrees. A non-traditional layup is a layup that includes at least one ply in which the fibers are oriented with an orientation other than the four traditional orientations listed above. Multiple plies in a non-traditional layup may include fibers orientated in an orientation other than the four traditional orientations. Further, a non-traditional layup may include plies that include fibers oriented in one of the traditional orientations combined with plies having fibers oriented in a non-traditional orientation.

The plies of the CFRP components (cargo beam 10, stanchions 20, and c-splice plates 30) are formed together at corresponding interfaces to form an integrated assembly as opposed to the prior art assembly that required each component to be connected together with fasteners. The interface areas 40 and 50 between each component may be thicker due to the combination of plies from each of the components as described in detail below. Each of the components of the cargo beam assembly 100 may include two flanges or chords. The integration of the components to form a single piece cargo beam assembly 100 may permit the flanges of each component to be facing a single direction. As discussed above, prior cargo beam assemblies do not permit an orientation such that all of the flanges or chords of the assembly may face a single direction. The bottom chord or flange of the cargo beam of the prior cargo beam assembly interferes with the attachment of the stanchions to the cargo beam. Thus, the cargo beam was rotated 180 degrees so that the stanchions were connected to the face of the cargo beam opposite of the flanges. This results in the flanges of the stanchions facing a different direction than the flanges of the cargo beam.

The CFRP cargo beam 10 includes an upper flange or chord 11 and a lower flange or chord 12. Each CFRP stanchion 20 includes a left flange or chord 21 and a right flange or chord 22. Each CFRP c-splice plate 30 includes an upper flange or chord 31 and a lower flange or chord 32. Where the flanges of the components meet, the CFRP plies may be formed together to create a thicker pad up area. For example, the left flange 21 of a CFRP stanchion 20 may be comprised of 18 plies and the lower flange 12 of the CFRP cargo beam 10 may also be comprised of 18 plies, but when formed together, the interface area 40 for the flanges 21 and 12 may be comprised of 36 plies providing greater strength. The interface area 40 for the flanges 21 and 12 may be formed into an arch or a flange radius. Likewise, the interface area 50 for the web of a CFRP cargo beam 10 and a CFRP stanchion 20 may have a combined thickness combining the plies of the two components. The upper flange 11 of the CFRP cargo beam 10 may include pad up areas 15 directly above the location of each CFRP stanchion 20. The pad up areas 15 may have greater thickness created by laying up a larger number of CFRP plies to provide greater strength to the cargo beam assembly 100.

Figure 2:
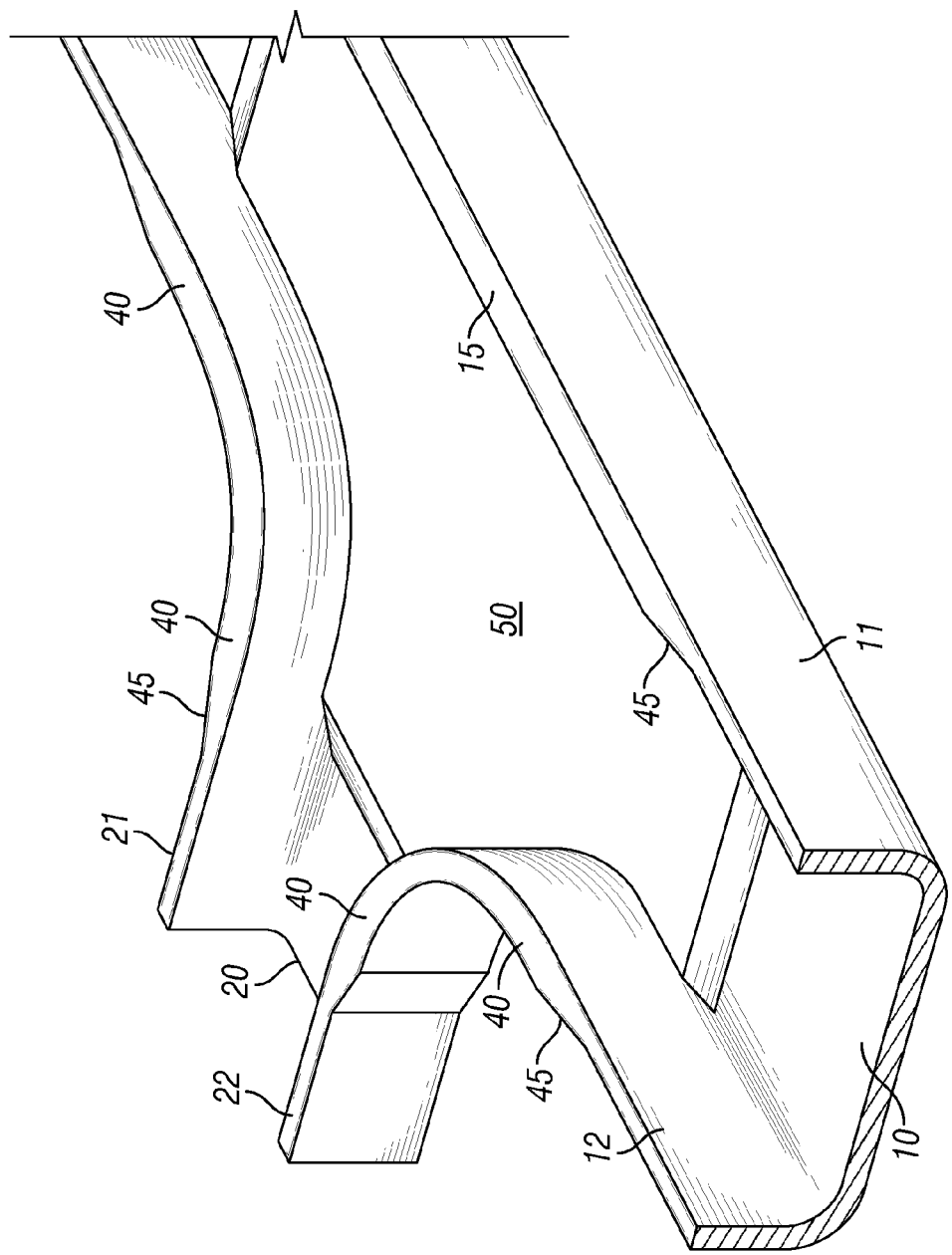
FIG. 2 shows a close-up view of the interface between a CFRP cargo beam and a CFRP stanchion.
Figure 3:
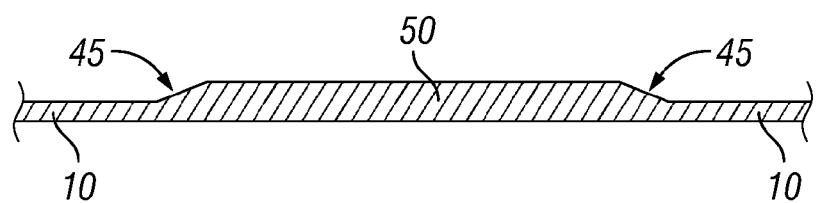
FIG. 3 is a partial cross-section view of the interface between a CFRP cargo beam and a CFRP stanchion.

FIG. 2 shows a close-up view of an interface area 40 formed into an arch between a CFRP cargo beam 10 and a CFRP stanchion 20 as well as the interface 50 between the two components. A ramp 45 may be formed at the edges of the interfaces 40 and 50 to gradually increase the thickness of the CFRP plies from the thickness of a single component to the thickness of the combined components. The ramp 45 may preferably have a slope of about 1:10. The formation of the ramp 45 will be discussed in more detail below. Darts 60 (shown in FIG. 4) may be cut into CFRP plies at the interface 40 to provide a smooth curved arch as well as to provide for load transfer between the CFRP cargo beam 10 and the CFRP stanchion 20 at the interface 40. FIG. 3 shows a partial cross-section view of the interface area 50 between a CFRP cargo beam 10 and a CFRP stanchion 20. The interface area 50 includes a ramp 45 that gradually increases the thickness of the CFRP plies on the CFRP cargo beam 10 to the combined thickness of CFRP plies of the CFRP cargo beam 10 and CFRP stanchion 20 at the interface 50.

Figure 4:
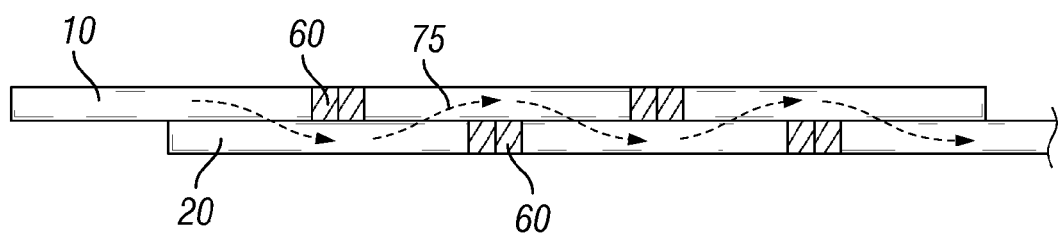
FIG. 4 is a diagram that shows the load transfer between a matching pair of CFRP cargo beam ply and a CFRP stanchion ply having an interface with alternating darting locations.

FIG. 4 is a schematic showing load transfer (designated by arrow 75) between a CFRP cargo beam 10 and a CFRP stanchion 20. The alternating placement of darts 60, or cuts, in the CFRP plies at the interface between the CFRP cargo beam 10 and CFRP stanchion 20 may aid in the load transfer between the two components at the interface. The alternating placement of darts 60 may aid in creating a unitary structure between the two individual components formed together to form a single assembly.

Figure 5:
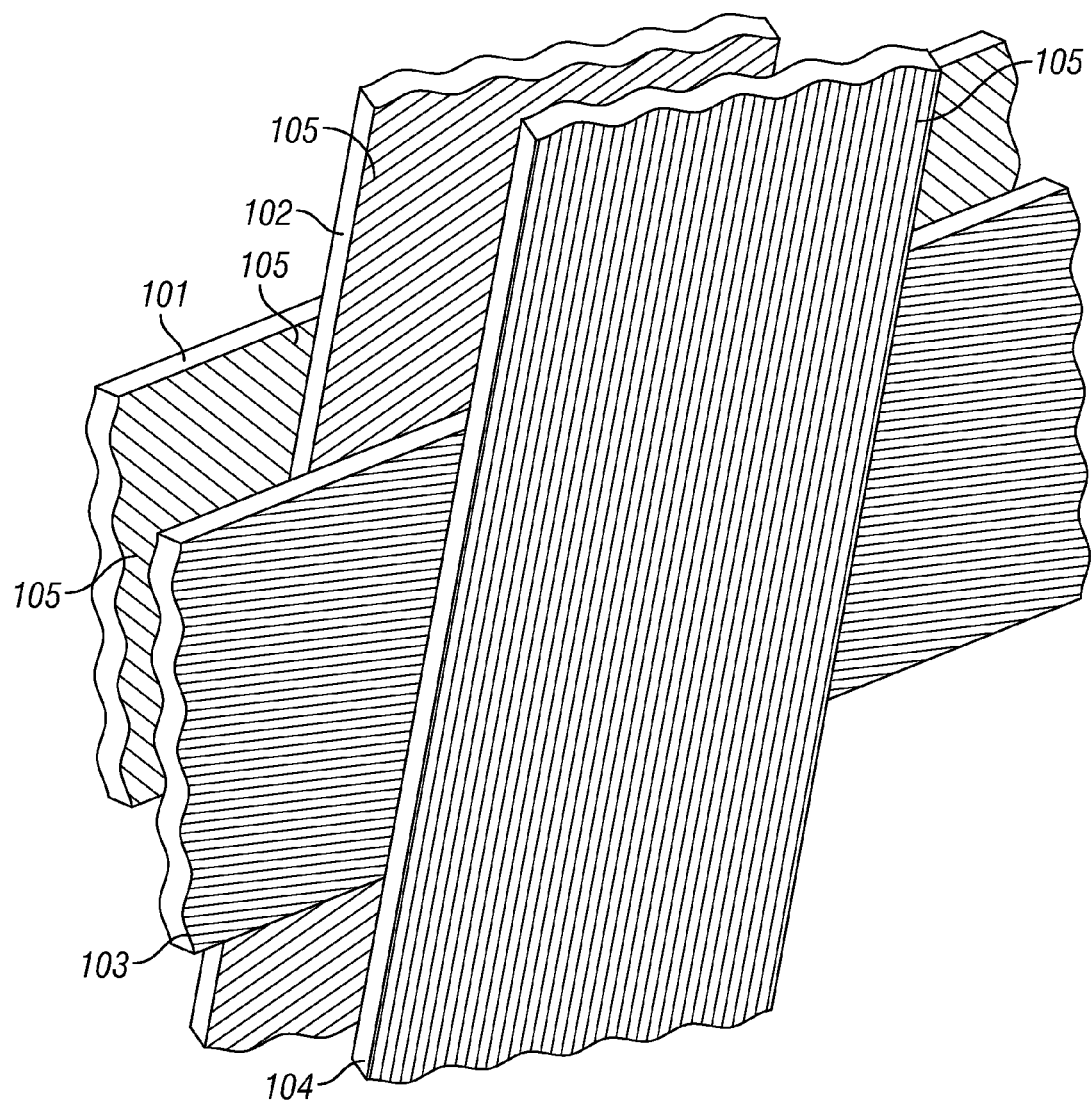
FIG. 5 shows CFRP plies of matching pairs of a CFRP cargo beam and a CFRP stanchion having a non-traditional layup and being configured to internally transfer load between the CFRP cargo beam and the CFRP stanchion and may be configured to form a ramp for the interface between a CFRP cargo beam and a CFRP stanchion.

FIG. 5 shows a potential configuration of CFRP plies 101-104 to transfer load internally between a CFRP cargo beam 10 (shown in FIG. 1) and a CFRP stanchion 20 (shown in FIG. 1). Plies 101 and 103 may be plies from a CFRP cargo beam 10 that are merged with plies 102 and 104 from a CFRP stanchion 20 at an interface area 50 between the CFRP cargo beam 10 and CFRP stanchion 20. The merging of the plies between the components aids in the internal load transfer between the two joined components.

FIG. 5 also shows a potential configuration of CFRP plies 101-104 to form a ramp 45 (shown in FIG. 2) to transition from a first thickness of the CFRP cargo beam 10 or a second thickness of the CFRP stanchion 20 to the interface area (40 or 50) where the plies from the two components (CFRP cargo beam 10 and CFRP stanchion 20) are formed together to a third thickness to form a unitary cargo beam assembly 100. The first thickness of the CFRP cargo beam 10 and the second thickness of the CFRP stanchion 20 may be the same. The CFRP plies 101-104 may be comprised of a non-traditional layup, meaning that at least one of the CFRP plies 101-104 includes fibers oriented at a degree other than zero (0) degrees, forty-five degrees (45), negative forty-five degrees (−45), or ninety (90) degrees. The orientation of fibers on the CFRP plies 101-104 having a non-traditional layup is represented by lines 105. A ramp 45 to transition from a first thickness to an interface area 40 and/or 50 between two components may be formed by dropping the edges of some CFRP plies to gradually increase the thickness of the CFRP plies in the formation of a ramp 45. Preferably, the ramp 45 may have a slope of 10:1. However, the slope and formation of the ramp may be varied as would be appreciated by one of ordinary skill in the art having the benefit of this disclosure.

Figure 6:
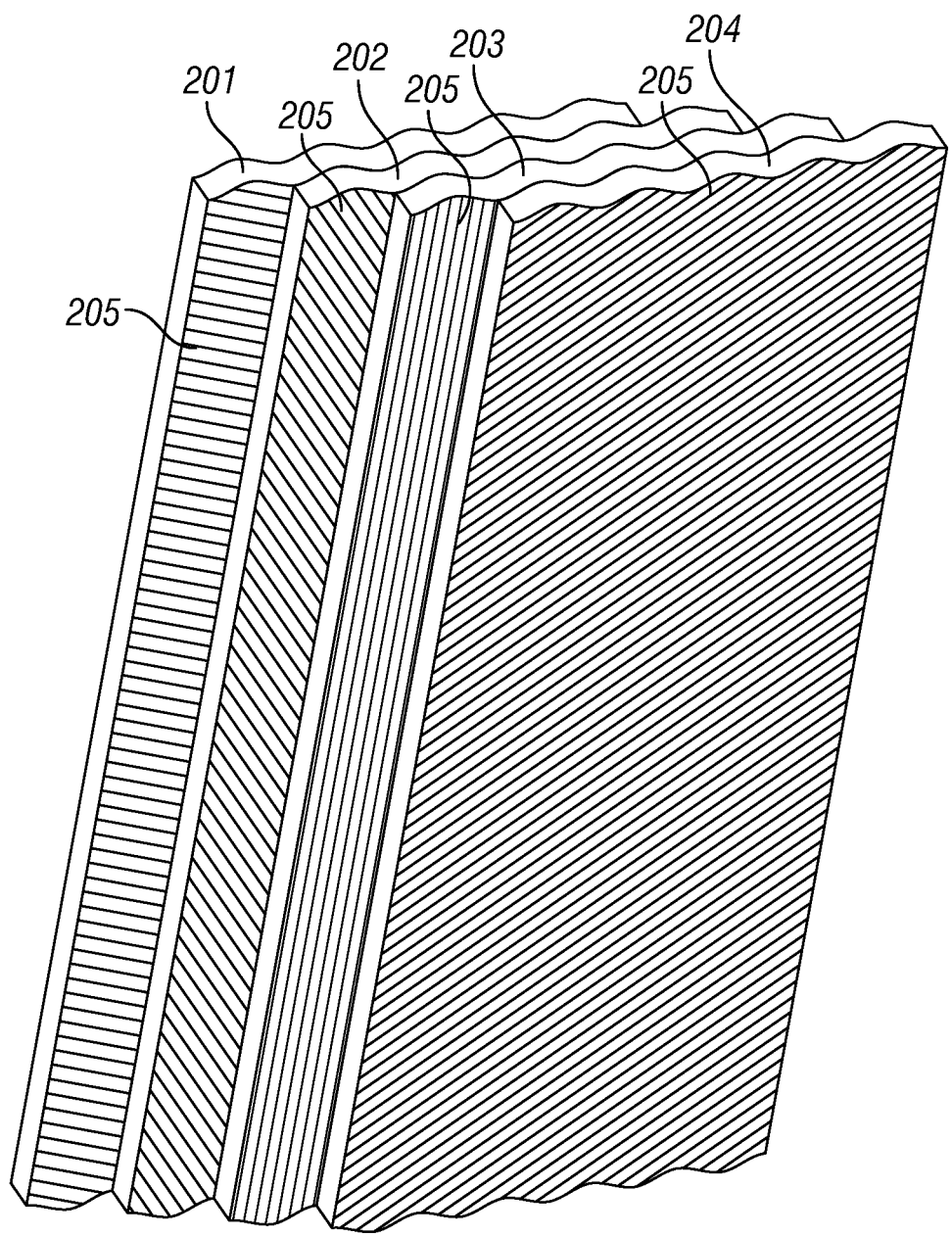
FIG. 6 shows a traditional layup orientation using sample 0, 90, 45, and −45 degree ply orientation.

FIG. 6 shows CFRP plies 201-204 that are formed from a traditional layup. Lines 205 designate the orientation of the fibers on each of the CFRP plies 201-204. The fibers 205 on ply 201 are oriented at ninety (90) degrees. The fibers 205 on ply 202 are oriented at forty five (45) degrees. The fibers 205 on ply 203 are oriented at zero (0) degrees. The fibers 205 on ply 204 are oriented at minus forty-five (−45) degrees. This pattern may be repeated with additional plies until the desired thickness of CFRP plies is achieved. Thus, a component formed from the CFRP plies 201-204 would be formed with a traditional layup.

FIG. 7 shows a cargo beam assembly 100 connected to a keel frame 280. The cargo beam assembly 100 includes a CFRP cargo beam portion 10, a plurality of CFRP stanchions 20, and two CFRP c-splice plates 30. The CFRP cargo beam portion 10, plurality of CFRP stanchions 20, and CFRP c-splice plates 30 may be formed together using traditional and non-traditional layups to form an integral one piece cargo beam assembly 100 that may be attached to the keel frame 280 at the CFRP stanchions 20 and CFRP c-splice plates 30. The one-piece CFRP cargo beam assembly 100 provides a single piece integral assembly reducing the number of fasteners that may be used to connect the assembly to a frame of an aircraft.

Figure 9:
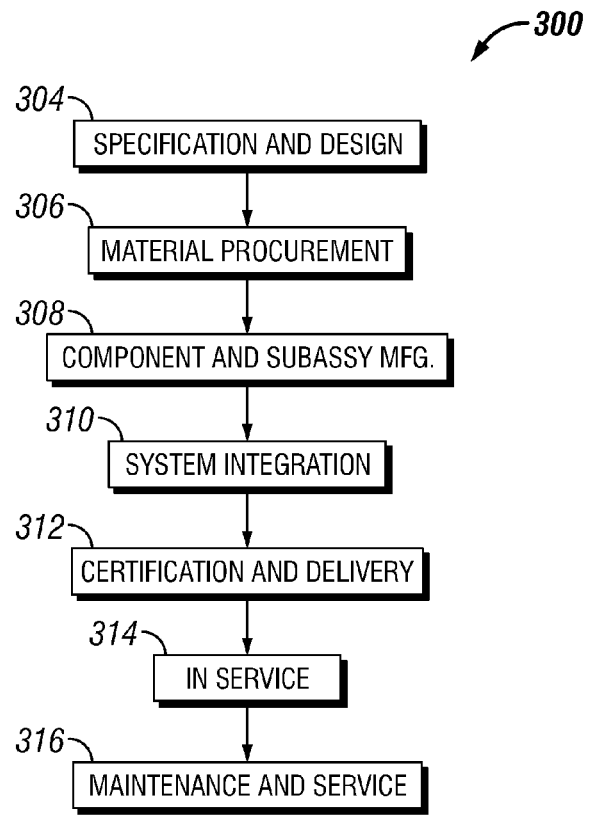
FIG. 9 is an illustration of a flow diagram of an aircraft manufacturing and service methodology.
Figure 10:
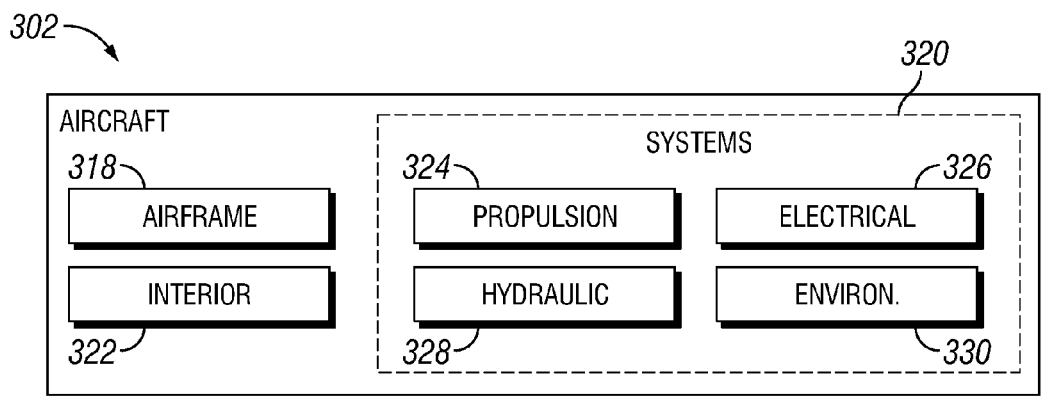
FIG. 10 is an illustration of a block diagram of an aircraft.

Referring to FIGS. 9-10, embodiments of the disclosure may be described in the context of an aircraft manufacturing and service method 300 as shown in FIG. 9 and an aircraft 302 as shown in FIG. 10. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the manufacturing and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production processes 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Figure 11:
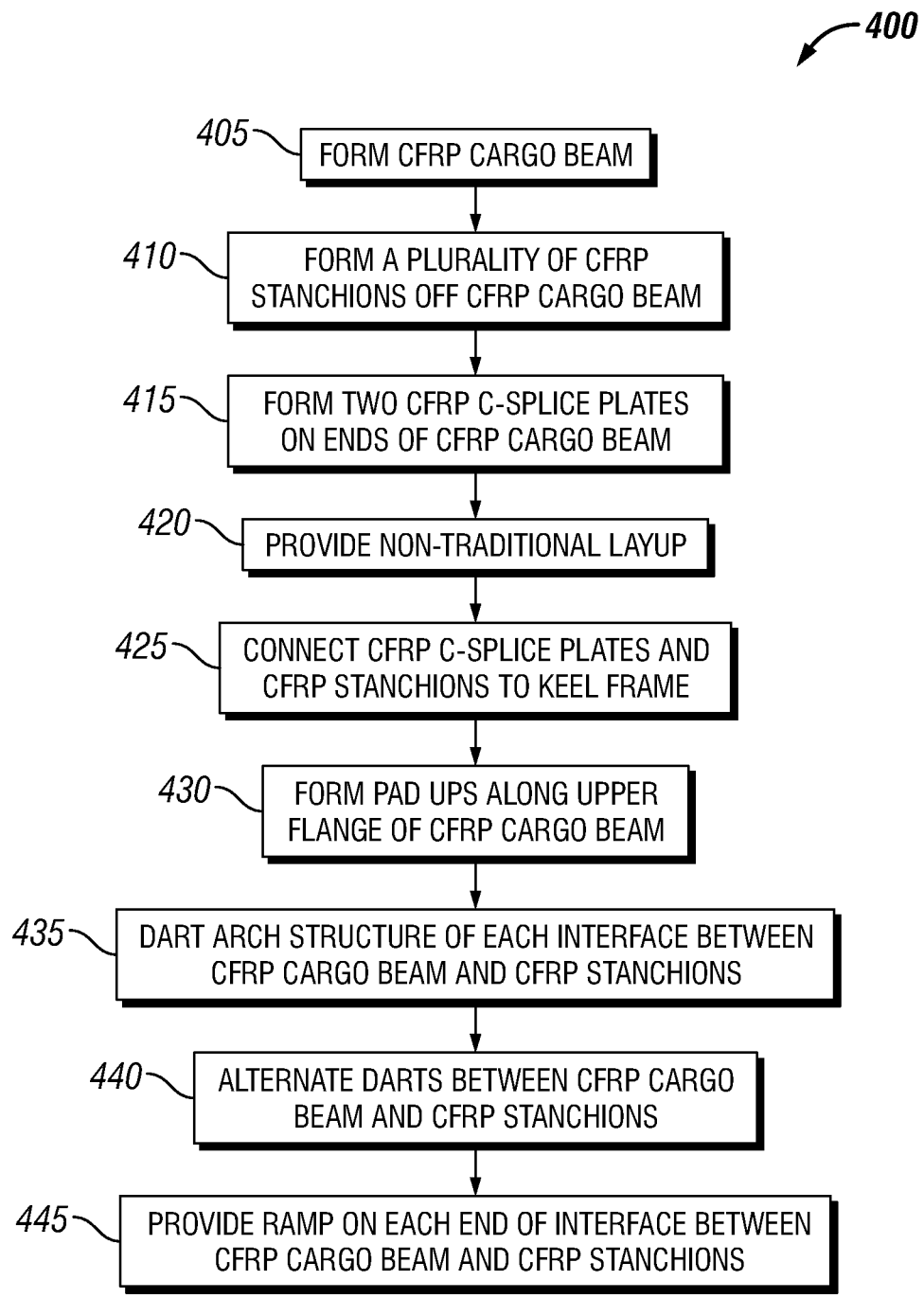
FIG. 11 is a flow diagram of a method for manufacturing a one-piece cargo beam assembly.

FIG. 11 shows a method 400 of manufacturing a one-piece cargo beam assembly that includes the step 405 of forming a CFRP cargo beam from a plurality of CFRP plies, the CFRP cargo beam having a first thickness, an upper flange, and a lower flange. The method 400 includes the step 410 of forming a plurality of CFRP stanchions that project from the lower flange of the CFRP cargo beam from a plurality of CFRP plies, the CFRP stanchions having a second thickness. The CFRP plies of the CFRP stanchions are combined with the CFRP plies of the CFRP cargo beam to form an interface having a third thickness greater than the first thickness of the CFRP cargo beam or the second thickness of the CFRP stanchions. The first thickness of the CFRP cargo beam 10 and the second thickness of the CFRP stanchion 20 may be the same. The method 400 includes the step 415 of forming two CFRP c-splice plates from a plurality of CFRP plies. The CFRP plies of each CFRP c-splice plate are combined with the CFRP plies located at an end of the CFRP cargo beam. A one-piece assembly is formed, comprised of the CFRP cargo beam, CFRP stanchions, and CFRP c-splice plates.

The method 400 may include the step 420 of providing the CFRP plies in a non-traditional layup pattern to form the CFRP cargo beam, the plurality of CFRP stanchions, and the CFRP c-splice plates. The method 400 may include the step 425 of connecting the CFRP c-splice plates and the CFRP stanchions to a keel frame. The method 400 may include the step 430 of forming pad ups along the upper flange or chord of the CFRP cargo beam. Pad ups may be formed above the location of each of the plurality of CFRP stanchions. The pad ups may be formed by the layup of additional CFRP plies. The method 400 may include the step 435 of darting arch structures of each interface between the CFRP cargo beam and the CFRP stanchions. The method 400 may include the step 440 of alternating the darting between the CFRP cargo beam and the CFRP stanchions for each interface. The alternating darting may provide load transfer between the CFRP cargo beam and the CFRP stanchions at each interface. The method 400 may include the step 445 of providing a ramp on each end of the interface between the CFRP cargo beam and each CFRP stanchion.

Although various embodiments have been shown and described, the present disclosure is not so limited and will be understood to include all such modifications and variations are would be apparent to one skilled in the art.

What is claimed is:

1. A cargo beam assembly for an aircraft, the assembly comprising:
    a carbon fiber reinforced polymer (CFRP) cargo beam;
    a plurality of CFRP stanchions integrally coupled to the cargo beam;
    a first CFRP c-splice plate integrally coupled to a first end of the cargo beam; and
    a second CFRP c-splice plate integrally coupled to a second end of the cargo beam;
    wherein the CFRP cargo beam, plurality of CFRP stanchions, first CFRP c-splice plate, and second CFRP c-splice plate each comprise two flanges;
    wherein the two flanges of the CFRP cargo beam, plurality of CFRP stanchions, first CFRP c-splice plate, and second CFRP c-splice plate each are oriented in a first direction.

2. The assembly of claim 1, the plurality of CFRP stanchions being configured to attach to a keel frame.

3. The assembly of claim 2, the first and second CFRP c-splice plates being configured to attach to the keel frame.

4. The assembly of claim 1, wherein the CFRP cargo beam and the plurality of CFRP stanchions comprise a plurality of CFRP plies configured in a non-traditional layup.

5. The assembly of claim 4, further comprising at least one pad up containing additional CFRP plies at an interface between the CFRP cargo beam and one CFRP stanchion.

6. The assembly of claim 5, wherein the interface between the CFRP cargo beam and the one CFRP stanchion comprises a flange radius.

7. The assembly of claim 6, further comprising a ramp at each end of the interface between the CFRP cargo beam and the one CFRP stanchion.

8. The assembly of claim 7, further comprising a plurality of alternating darts in the interface between the CFRP cargo beam and the one CFRP stanchion, wherein the plurality of alternating darts are configured to provide load transfer between the CFRP cargo beam and the one CFRP stanchion at the interface.

9. The assembly of claim 1, wherein an upper flange of the CFRP cargo beam comprises at least one pad up containing additional CFRP plies.

10. The assembly of claim 1, further comprising a plurality of pad ups containing additional CFRP plies along an upper flange of the CFRP cargo beam, wherein each of the plurality of pads ups is positioned above a single CFRP stanchion.

11. A method to manufacture a one-piece cargo beam assembly for an aircraft, the method comprising:
    forming a carbon fiber reinforced polymer (CFRP) cargo beam from a first plurality of CFRP plies, the CFRP cargo beam having a first thickness, an upper flange, and a lower flange, the upper flange and the lower flange each being oriented in a first direction;
    forming a plurality of CFRP stanchions that project from the lower flange of the CFRP cargo beam from a second plurality of CFRP plies each of the plurality of CFRP stanchions having two flanges oriented in the first direction connected to the lower flange of the CFRP cargo beam, the plurality of the CFRP stanchions having a second thickness, the second plurality of CFRP plies of the plurality of CFRP stanchions combining with the first plurality of CFRP plies of the CFRP cargo beam to form an interface having a third thickness greater than the first thickness of the CFRP cargo beam and greater than the second thickness of the plurality of CFRP stanchions; and
    forming two CFRP c-splice plates from a third plurality of CFRP plies, the third plurality of CFRP plies of each CFRP c-splice plate combining with the first plurality of CFRP plies located at an end of the CFRP cargo beam;
    wherein a one-piece assembly is formed comprised of the CFRP cargo beam, plurality of CFRP stanchions, and two CFRP c-splice plates.

12. The method of claim 11, further comprising providing a portion of the first and second plurality of CFRP plies in a non-traditional layup pattern to form a pad up at each intersection of the CFRP cargo beam and each of the plurality of CFRP stanchions.

13. The method of claim 11, further comprising connecting the two CFRP c-splice plates and the plurality of CFRP stanchions to a keel frame.

14. The method of claim 11, further comprising forming pad ups along the upper flange of the CFRP cargo beam above each of the plurality of CFRP stanchions, wherein the pad ups are formed by a layup of additional CFRP plies.

15. The method of claim 11, wherein the interface between each CFRP stanchion with the lower flange of the CFRP cargo beam includes two arch structures.

16. The method of claim 15, further comprising darting the two arch structures of the interface between the lower flange of the CFRP cargo beam and each CFRP stanchions.

17. The method of claim 16, further comprising alternating the darting for each interface, wherein the alternating of the darting provides load transfer between the CFRP cargo beam and each CFRP stanchion at the interface.

18. The method of claim 17, further comprising forming a ramp on each end of the interface between the lower flange of the CFRP cargo beam and each CFRP stanchion.

19. The assembly of claim 1, wherein CFRP plies of the CFRP cargo beam are formed together with CFRP plies of each CFRP stanchion, wherein CFRP plies of the CFRP cargo beam are formed together with CFRP plies of the first CFRP c-splice plate, and wherein CFRP plies of the CFRP cargo beam are formed together with CFRP plies of the second CFRP c-splice plate.

20. A cargo beam assembly for an aircraft, the assembly comprising:
   a carbon fiber reinforced polymer (CFRP) cargo beam having a first thickness, an upper flange, and a lower flange, the upper flange having a first thickness;
   a plurality of CFRP stanchions integrally coupled to the cargo beam, each of the plurality of CFRP stanchions having two flanges that are integrally coupled with the lower flange of the CFRP cargo beam and further comprising a ramp at an interface between the lower flange of the CFRP cargo beam and each of the flanges of the plurality of CFRP stanchions;
   wherein the upper flange of the CFRP cargo beam has a second thickness in a region above each of the plurality of CFRP stanchions that is greater than the first thickness of the upper flange;
   wherein the CFRP cargo beam has a second thickness greater than the first thickness where each of the plurality of CFRP stanchions is coupled to the CFRP cargo beam;
   a first CFRP c-splice plate integrally coupled to a first end of the cargo beam, the first CFRP c-splice plate having a profile; and
   a second CFRP c-splice plate integrally coupled to a second end of the cargo beam, the second CFRP c-splice plate having a profile;
   wherein the CFRP cargo beam, plurality of CFRP stanchions, first CFRP c-splice plate, and second CFRP c-splice plate each have the same profile.

* * * * *